(No Model.)

D. C. FUNCHEON.
BARBED WIRE.

No. 493,210. Patented Mar. 7, 1893.

Witnesses
G. J. Roccanne.
Wm McConnell

D. C. Funcheon
Inventor
By his Attorney A. J. O'Brien

THE NORRIS PETERS CO., PHOTO-LITHO., WASHINGTON, D. C.

UNITED STATES PATENT OFFICE.

DANIEL C. FUNCHEON, OF VALVERDE, COLORADO, ASSIGNOR OF TWO-THIRDS TO GEORGE FUNCHEON AND CHARLES E. OLSEN, OF SAME PLACE.

BARBED WIRE.

SPECIFICATION forming part of Letters Patent No. 493,210, dated March 7, 1893.

Application filed July 15, 1892. Serial No. 440,184. (No model.)

*To all whom it may concern:*

Be it known that I, DANIEL C. FUNCHEON, a citizen of the United States of America, residing at Valverde, in the county of Arapahoe and State of Colorado, have invented certain new and useful Improvements in Barbed Wire; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in barbed wire for fence use and the object of the invention is to provide a wire with rotating barbs and its special feature is the barb holder which consists of a button or small block suitably attached to the wire and apertured to receive the axis of the barb, the prongs of both of which are formed at the extremities of the axis and bent at a suitable angle to retain them in place, the barb being adapted to rotate freely within the holder.

It is believed that the advantages of the rotating barb over the rigid barb for fence use, are now generally recognized, since while answering all the requirements in a fence it is not so harsh as the rigid barb and often prevents disastrous results to stock. The reason is plain since if an animal is running lengthwise of the fence and comes in contact therewith, if the barb is movable or can rotate, it turns and draws out of the animal's flesh, while in case of a rigid barb a long cut is made therein. Hence a further object of the invention is to provide a fence wire of the class stated which shall be simple in construction, economical in cost, reliable, durable, efficient and practicable in use.

To these ends the improvement consists of the features hereinafter described and claimed and will be fully understood by reference to the accompanying drawings in which is illustrated an embodiment of the invention.

Figure 1:
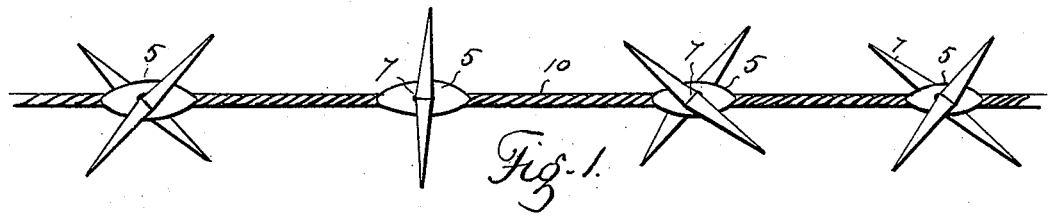
Figure 2:
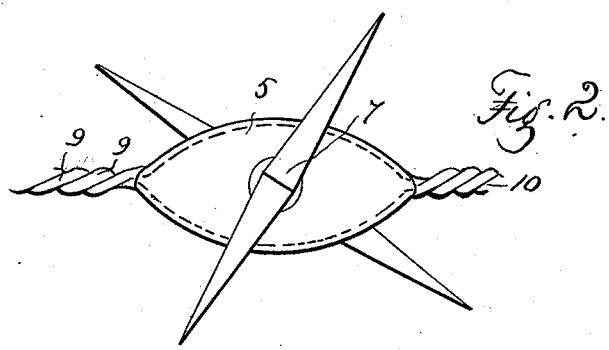
Figure 3:
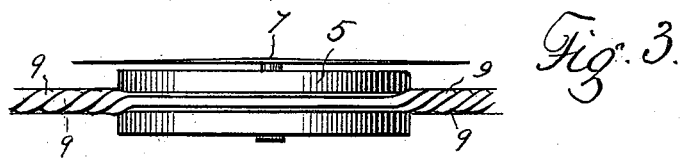
Figure 5:
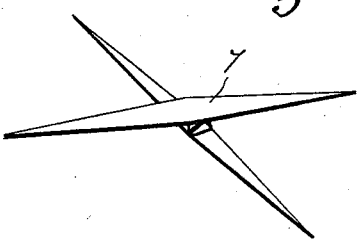
Figure 4:

In the drawings, Figure 1 shows a wire provided with my improvement. Fig. 2 is a fragmentary top view on a larger scale showing the barb holder with the barb in place. Fig. 3 is a side or edge view of the same. Fig. 4 illustrates the barb holder in detail perspective. Fig. 5 is a similar view of the rotating barb.

Similar reference characters indicate corresponding parts or elements of the mechanism in the several views.

Let the numeral 5 designate the barb holder which as shown in the drawings is provided with an aperture 6 for the reception of the barb 7. This holder is further provided with a circumferential groove 8 engaged by the wires 9 which as shown in the drawings are two in number and form the strands which when twisted together around the barb holders form the complete fence wire 10, the barbs being supported by the holders the axis of the one engaging the aperture 6 of the other. As shown in the drawings the barb holder is elliptical in shape and provided with a peripheral edge groove 8 and central aperture 6. The barb holder may, however, be of any other desired shape or contour, and may be fastened to the wire strands composing the fence wire in any suitable manner other than that shown in the drawings.

The barb as shown herein consists of a shank or axis engaging the aperture 6, its extremities being split and bent at right angles on both sides of the holder to form the prongs or projections. The barb may be composed of two strands centrally twisted to form the axis, their extremities being bent in opposite directions to form the barbs. Any other desired form of rotating barb, may however, be employed in connection with my improved holder as a support.

Having thus described my invention, what I claim is—

1. A barbed fence wire composed of small buttons or blocks suitably supported upon the wire strands and carrying rotating barbs, the extremities of which are bent to form an angle with the axes substantially as described.

2. In a barbed fence wire the combination with the wire strands, of apertured buttons or blocks supported thereon and carrying rotating barbs the axes of which are located in the apertures of the buttons, and their extremities bent to form an angle with the axes substantially as described.

3. In a barbed fence wire the combination with the wire strands, of the apertured holder provided with the peripheral groove engaged by the strands which are twisted to secure the barb holder in place, and rotating barbs having their axes engaging the apertures in the barb holders and their extremities bent to form the desired angle with the axes, substantially as described.

In testimony whereof I affix my signature in presence of two witnesses.

DANIEL C. FUNCHEON.

Witnesses:
WM. MCCONNELL,
G. H. STOVER.